United States Patent [19]

Innes

[11] 3,965,730

[45] June 29, 1976

[54] VORTEX SHEDDING DEVICE FOR USE IN MEASURING AIR FLOW RATE INTO AN INTERNAL COMBUSTION ENGINE

[75] Inventor: Gary L. Innes, Flat Rock, Mich.

[73] Assignee: Ford Motor Company, Dearborn, Mich.

[22] Filed: Apr. 28, 1975

[21] Appl. No.: 572,606

[52] U.S. Cl. ............................. 73/118; 73/194 VS
[51] Int. Cl.² .................. G01M 17/00; G01F 1/32
[58] Field of Search ............. 73/194, 118; 138/37, 138/41, 42, 44

[56] References Cited
UNITED STATES PATENTS

| | | | |
|---|---|---|---|
| 1,935,445 | 11/1933 | Heinz | 73/194 |
| 3,116,639 | 1/1964 | Bird | 73/194 |
| 3,645,132 | 2/1972 | Rasmussen | 73/194 X |
| 3,698,245 | 10/1972 | McNabb | 73/194 |
| 3,722,275 | 3/1973 | Rodely | 73/194 |
| 3,733,900 | 11/1971 | DeBaum | 138/137 X |
| 3,818,877 | 6/1974 | Barrera et al. | 73/194 X |
| 3,874,234 | 4/1975 | Burgess | 73/194 |

*Primary Examiner*—Herbert Goldstein
*Attorney, Agent, or Firm*—Robert W. Brown; Keith L. Zerschling

[57] ABSTRACT

A vortex shedding device for use in measuring air flow rate into an internal combustion engine includes a conduit having a passage that includes a venturi section. The venturi section has an inlet portion, a throat portion that has a smaller cross-sectional area than the cross-sectional area of the inlet portion, a converging portion between the inlet and throat portions and a diverging portion extending away from the throat portion toward the end of the passage. An elongated element is located in the throat portion of the passage for the purpose of generating vortices in air flowing through the passage. Preferably, the venturi section of the passage is of rectangular cross-section throughout and a honeycomb structure and screen are located in the inlet portion of the venturi section.

2 Claims, 7 Drawing Figures

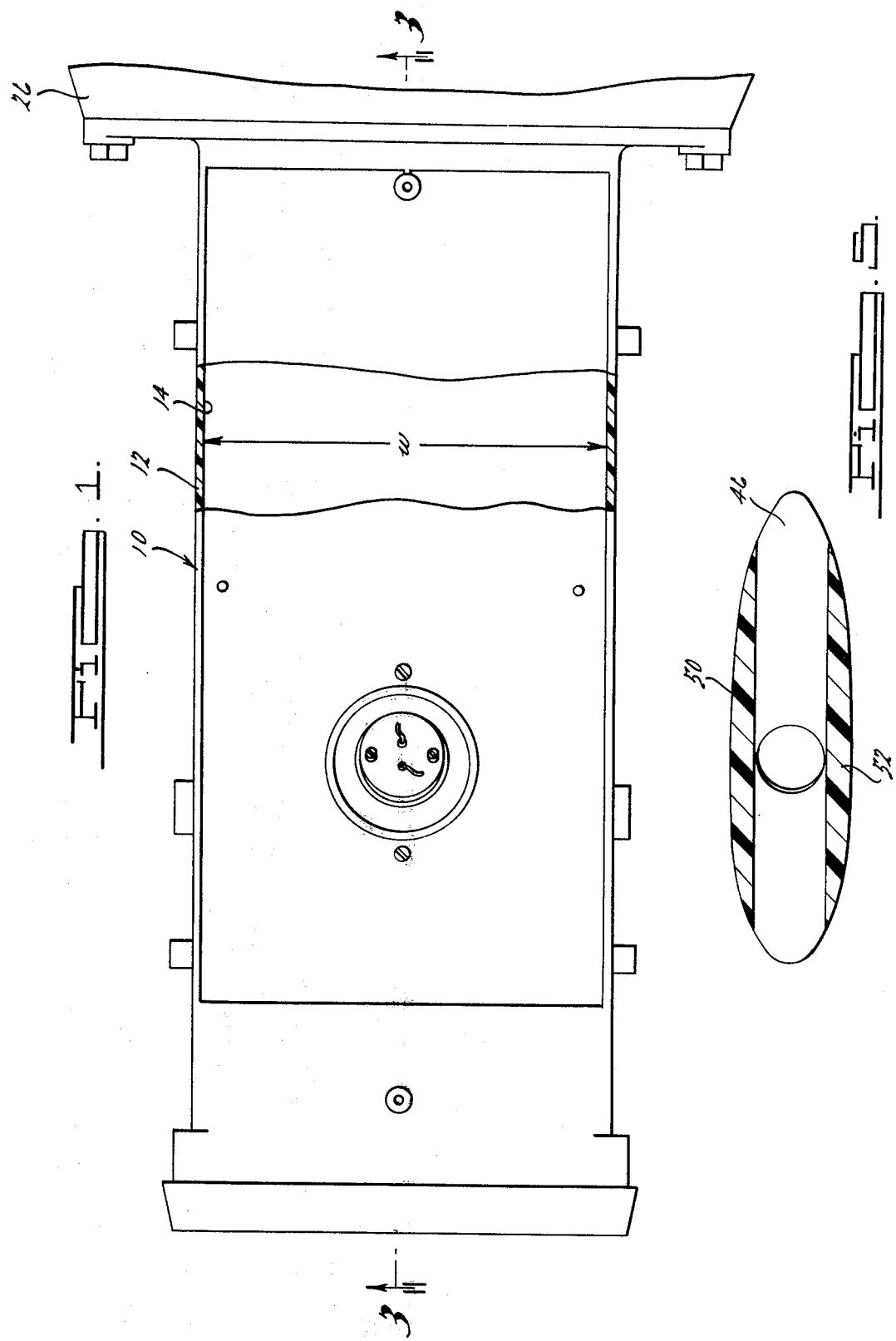

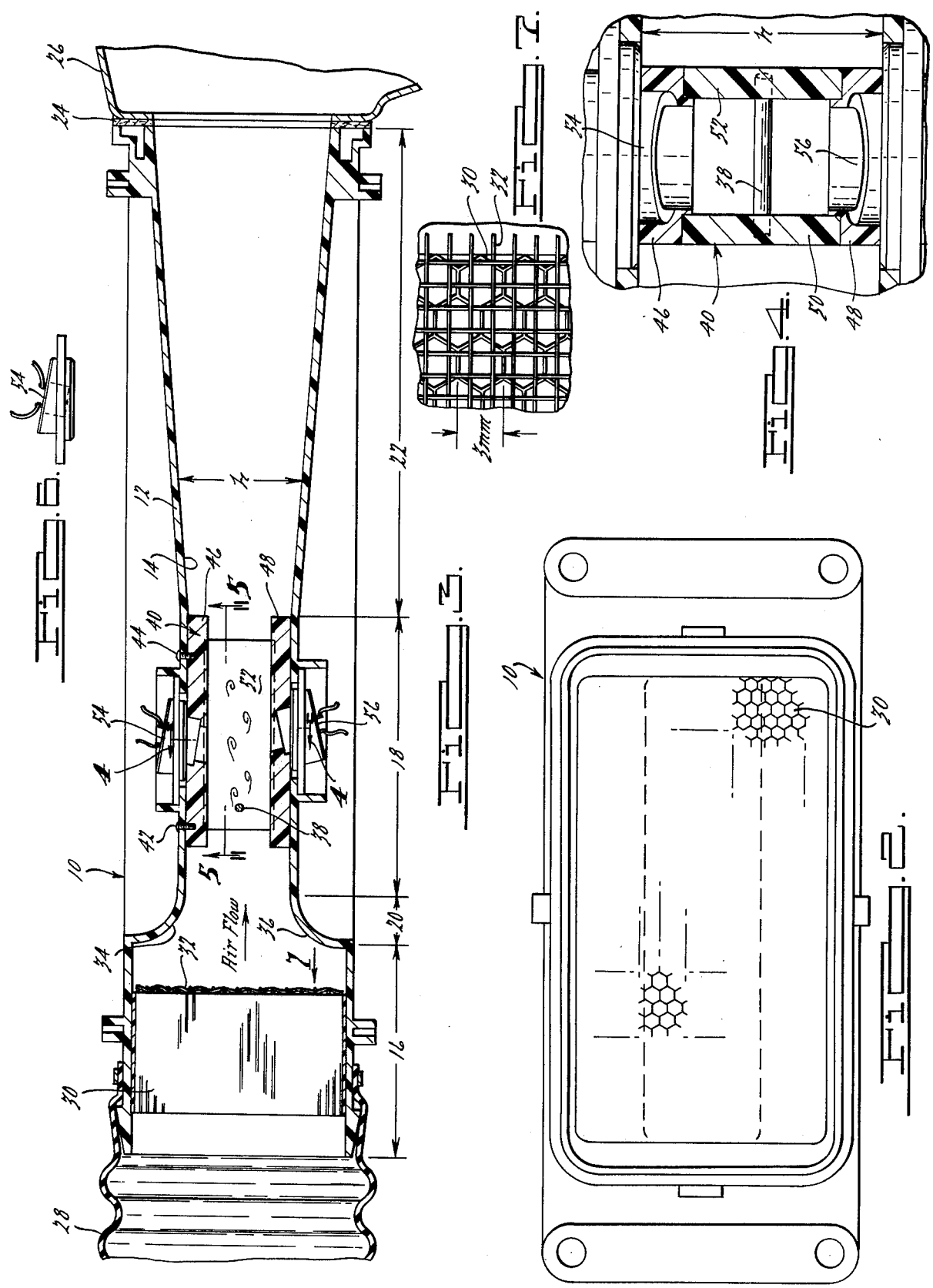

3,965,730

VORTEX SHEDDING DEVICE FOR USE IN MEASURING AIR FLOW RATE INTO AN INTERNAL COMBUSTION ENGINE

BACKGROUND

This invention relates to a vortex shedding device for use in measuring the rate at which air flows into the air intake of an internal combustion engine. The subject matter of this commonly assigned patent application is related to that of similarly entitled and concurrently filed U.S. application Ser. No. 572,605 in the name of Carlos M. Barrera.

Of the prior art references known by the inventor, U.S. Pat. Nos. 3,722,275 to Rodely et al. and 3,818,877 to Barrera et al. are believed to be the most pertinent to the present invention. To the extent necessary for an understanding of the present invention, the disclosure of U.S. Pat. No. 3,818,877 is incorporated herein by reference. Other patents of interest include U.S. Pat. Nos. 3,756,078 to Yamasaki et al.; 3,863,500 to Yamasaki et al.; and 3,854,334 to Herzl.

Over the years, many attempts have been made to measure continuously the amount of air entering a spark ignition internal combustion engine. This information concerning air intake of the engine can be used to control the amount of fuel metered to the engine or for other engine control purposes. In automotive applications, the engine is operated under varying conditions of engine speed and load and the air intake varies accordingly. Also, numerous transient conditions occur during engine operation. This necessitates, if the air intake flow to the engine is to be measured and used as a control parameter, a flow measuring device that will provide a continuous indication of the instantaneous or substantially instantaneous flow rate into the engine. A satisfactory air flow measuring device must be able to respond over a wide range of air intake flow rates in a substantially linear manner and must have rapid response time and provide a substantially instantaneous indication of such flow rate to permit this to be used as a control parameter in transient conditions of engine operation. Moreover, the metering device must not produce a large pressure drop in the engine air intake system.

In a vortex shedding device for use in measuring air flow rate, typically an elongated element is positioned in the path of the air flow to partially obstruct this flow. Over a range of Reynolds numbers, vortices are generated in the air by such element at a frequency or rate which is proportional to the air velocity. If the number of generated vortices are counted over a known period of time, the air velocity may be easily determined, and, with the element positioned in a conduit of fixed cross-sectional area in the region of the element, an indication of volumetric flow rate is obtained.

In order to apply a vortex shedding device to the measurement of the air intake into an internal combustion engine, it is necessary to obtain an accurate indication of flow rate on a substantially instantaneous basis. Therefore, it is necessary to count the generated vortices for only a very short period of time to provide such substantially instantaneous indication of flow rate. In prior art vortex shedding devices, the frequency of vortex generation has tended to vary over short time intervals even though this frequency, if averaged over a long period such as a few seconds, may be substantially constant. Moreover, the frequency of vortex generation as a function of the air velocity has been quite nonlinear in prior art devices. The present invention overcomes these problems of the prior art.

SUMMARY OF THE INVENTION

In accordance with the invention, a vortex shedding device for use in measuring the rate at which air flows into the air intake of an internal combustion engine comprises a conduit having a passage within it through which air whose flow rate is to be measured may flow. The conduit has a venturi section formed in it. The venturi section includes an inlet portion, a throat portion smaller in cross-sectional area than the cross-sectional area of the inlet portion, a converging portion between the inlet and throat portions, and a diverging portion extending away from the throat portion toward the end of the passage remote from the inlet portion. An elongated element for generating vortices in air flowing in the passage is located in the throat portion of the passage and extends transverse to the direction of air flow. It is preferred that the passage be of rectangular cross-section throughout and that, with respect to the length of the passage, the converging portion of the venturi section is only a small fraction of the length of the diverging portion of the venturi section. A honeycomb structure and/or a screen may be positioned in the inlet portion of the venturi section to produce stratified air flow and to aid in eliminating air velocities other than in the general direction of air flow.

The invention may be better understood by reference to the detailed description which follows and to the drawings.

BRIEF DESCRIPTION OF THE DRAWINGS

FIG. 1 is a plan view of a vortex shedding device for use in measuring the rate at which air flows into the air intake of an internal combustion engine;

FIG. 2 is a view looking into the inlet (left) end of the vortex shedding device shown in FIG. 1;

FIG. 3 is a sectional view taken along the line 3—3 in FIG. 1;

FIG. 4 is a sectional view taken along the line 4—4 in FIG. 3;

FIG. 5 is a sectional view taken along the line 5—5 in FIG. 3;

FIG. 6 is a view of a transducer and its mounting, which transducer may be utilized to count vortices generated in air flowing through the vortex shedding device; and FIG. 7 is an enlarged partial view in the direction of the arrow 7 in FIG. 3.

DETAILED DESCRIPTION

With reference now to the drawings, wherein like numerals refer to like parts in the several views, there is shown a vortex shedding device 10 for use in measuring the rate at which air flows into the air intake of an internal combustion engine. The vortex shedding device 10 includes a conduit 12 having a passage 14 within it through which air flows to the engine. The direction of the air flow is indicated in FIG. 3.

The passage 14 in the conduit 12 is a venturi section including an inlet portion 16, a throat portion 18 smaller in cross-sectional area than the cross-sectional area of the inlet portion, a converging portion 20 between the inlet and throat portions, and a diverging portion 22 extending away from the throat portion 18 toward the end of the passage 14 remote from the inlet portion 16. At the end 24 of the diverging portion 22, the vortex shedding device 10 may be connected to an engine air cleaner 26 conventionally covering and filtering the air entering the carburetor or other air intake device included in a spark ignition internal combustion engine. At the inlet end 16 of the vortex shedding device 10, a flexible conduit 28 may be provided to channel the air entering the internal combustion engine through the vortex shedding device 10.

The venturi section including inlet portion 16, converging portion 20, throat portion 18 and diverging portion 22 is of rectangular cross-section throughout. In this connection, the cross-sectional area dimensions of the rectangular venturi section are designated as the width $w$ (FIG. 1) and the height $h$ (FIG. 3). In the preferred form of the invention, the width $w$ is the greater of these dimensions and is constant throughout the length of the venturi section including portions 16, 20, 18 and 22. The variation in cross-sectional area in the passage 14 is achieved solely by varying the height dimension $h$. Of course, the minimum cross-sectional area of the venturi section occurs in its throat portion 18 and it is preferred that this minimum cross-sectional area be between about one-third and one-half of the cross-sectional area of the inlet portion 16. Preferably, the area of the throat portion 18 is selected or sized, relative to the internal combustion engine, to achieve a maximum flow velocity in the range from about 76 to 92 in/sec.

The inlet portion 16 includes a honeycomb structure 30 and a screen 32 located on the downstream side of the honeycomb structure. The honeycomb structure 30 and screen 32 provide flow conditioning of air entering the vortex shedding device 14. This flow conditioning tends to produce a stratified and uniform flow field entering the inlet portion 16 of the venturi section and tends to eliminate air velocities other than those in the general direction of air flow indicated in FIG. 3. The honeycomb structure 30 preferably is formed from a thin wall cellular plastic material having hexagonal flow channels as shown in FIG. 7. Preferably, the distance between opposite flats of the hexagonal flow channels is approximately 3 mm and the length of the hexagonal flow channels is about 30 mm. With respect to the screen 32, a mesh size in the range from 10 to 40 wires per inch have been utilized, but a mesh size of 20 wires per inch is preferred. A greater mesh number may produce an undesirable pressure drop, while a smaller mesh number may not provide a desired flow conditioning improvement. The honeycomb structure 30 and screen 32 should be located between about 2.5 and 10 cm. upstream of a vortex generating elongated element 38 hereinafter described.

The converging portion 20 of the venturi section is formed by radii 34 and 36 formed in the conduit 12 to reduce the height dimension $h$ of passage 14. This structural design provides a rapid transition from the large cross-sectional area of the inlet portion 16 to the substantially smaller cross-sectional area in the throat portion 18 of the venturi section.

The elongated element 38 for generating vortices in air flowing through the passage 14 is mounted in the throat portion 18 of the venturi section and preferably between about ½ to 1½ throat heights $h$ downstream of the converging portion 20. The element 38 is positioned transverse to the air flow direction indicated in FIG. 3 and has its length parallel to the width dimension $w$ of the passage 14. Over a range of Reynolds numbers, for example, from 360 to 18,000, vortices are generated by and shed by the element 38 at a frequency or rate proportional to the velocity of the air flowing past the element 38, as illustrated in FIG. 3. If these vortices are counted for a predetermined length of time, the resulting count is indicative of this flow velocity and the air volumetric flow rate through the passage 14. In the application of the vortex shedding device 10 to an internal combustion engine, it is necessary that this predetermined time period of vortex counting be less than 10 milliseconds if a substantially instantaneous measure of flow rate is to be obtained sufficient to enable an engine to be controlled during its transient conditions. Because of this short counting interval of less than 10 milliseconds, the data rate or frequency at which the vortices are generated, and the consistency of this frequency during succeeding intervals, becomes very important. Moreover, while the frequency at which the vortices are generated is proportional to the air flow velocity, the prior art vortex shedding devices have been found quite unsatisfactory because their factor of proportionality was not constant over a wide range of flow velocities so that a nonlinear function of vortex frequency versus flow velocity resulted. In an internal combustion engine having a displacement of about 400 cubic inches, the intake air flow may range from about 20 to 360 cubic feet per minute, and, with an engine on the order of 200 cubic inch displacement, the intake air flow may range from about 6 to 150 cubic feet per minute. A linear response of the vortex shedding device over these flow ranges is highly desirable.

The structure described herein has provided substantial improvements over the prior art devices. In order to achieve this improved response, it has been found desirable to use an elongated element 38 having a maximum cross-sectional dimension in the range from about 1.5 to 3 mm. The elongated element 38 may be of circular cross-section or it may be of semi-circular cross-section. Other cross-sectional configurations, such as triangular or trapezoidal may also be utilized. Currently, a circular cross-section is preferred for the element 38.

The elongated vortex generating element 38 is mounted in a flow isolating structure 40 that is centrally positioned within the passage 14 and which is secured to the conduit 12 by attaching screws 42 and 44. The flow isolating structure 40, which may best be seen in FIGS. 4 and 5, includes tear-drop-shaped members 46 and 48 located on opposite sides of the passage 14 and parallel members 50 and 52 positioned between the members 46 and 48. The elongated element 38 is mounted between the members 50 and 52.

A sonic transmitter 54 and a sonic receiver 56 are mounted, respectively, in the members 46 and 48. These transducers preferably are piezoelectric crystals. The sonic transmitter 54 is positioned at a slight angle so that sonic waves are transmitted slightly upstream prior to impinging upon the sonic receiver 56. The receiver 56 also is angled in the slightly upstream direction and may be located somewhat downstream of the sonic transmitter 54. This positioning of the transducers is designed to alleviate the effect of the air flow on sonic waves transmitted between the transmitter 54 and the receiver 56. The transducers 54 and 56 may be utilized in circuitry. such as that described in previously mentioned U.S. Pat. No. 3,818,877 to Barrera et al., to provide a count of vortices generated by the elongated element 38 during air flow through the device 10.

FIG. 6 illustrates the manner in which the transducers 54 and 56 are mounted in the members 46 and 48.

The diverging portion 22 of the venturi section provides a gradual transition between the minimum cross-sectional area in the throat portion 18 to a much larger cross-sectional area approaching that of the inlet portion 16. This gradual transition in cross-sectional area of the diverging portion 22 occurs over a length of the passage 14 which is approximately ten times the length of the converging portion 20.

Based upon the foregoing description of the invention, what is claimed is:

1. A vortex shedding device for use in measuring the rate at which air flows into the air intake of an internal combustion engine, said device comprising:

a conduit having a passage within it through which air whose flow rate is to be measured may flow, said passage having a venturi section formed in it, said venturi section being of rectangular cross-section throughout and having width and height dimensions, the width dimension being the greater of said dimensions, said venturi section including an inlet portion a throat portion having a cross-sectional area in the range from about one-third to about one-half of the cross-sectional area of said inlet portion, a converging portion between said inlet and throat portions, and a diverging portion extending away from said throat portion toward the end of said passage remote from said inlet portion, said converging and diverging portions being formed by variation of said height dimension, said width dimension being constant over the length of said venturi section, an elongated element for generating vortices in air flowing in said passage in a direction from said inlet portion toward said diverging portion, said elongated element being located in said throat portion of said passage and extending transverse to said direction of air flow and parallel to said width dimension, said elongated element being of circular or semi-circular cross-section and having a diameter in the range from about 1.5 mm to 3.5 mm, a honeycomb structure positioned in said inlet portion of said passage venturi section, said honeycomb structure having a plurality of flow channels extending in said direction of said air flow to impart stratified characteristics to such air flow, said honeycomb structure being spaced from said converging portion of said venturi section, and said cross-sectional area of said throat portion being sized, relative to said internal combustion engine, to achieve a maximum flow velocity in said throat portion in the range from about 76 to about 92 m/sec.

2. A vortex shedding device according to claim 1 wherein the length of said converging portion of said venturi section of said passage is only about one-tenth of the length of said diverging portion of said venturi section.

* * * * *